(12) United States Patent
Yun

(10) Patent No.: US 7,984,672 B1
(45) Date of Patent: Jul. 26, 2011

(54) AUTOMATIC SMOKING SYSTEM FOR FOOD PRODUCTS AND ASSOCIATED METHOD

(76) Inventor: Yong Sung Yun, Los Angeles, CA (US)

( * ) Notice: Subject to any disclaimer, the term of this patent is extended or adjusted under 35 U.S.C. 154(b) by 835 days.

(21) Appl. No.: 11/890,430

(22) Filed: Aug. 6, 2007

Related U.S. Application Data

(60) Provisional application No. 60/835,578, filed on Aug. 7, 2006.

(51) Int. Cl.
*A23B 4/03* (2006.01)
*A23B 4/044* (2006.01)
*B60H 3/00* (2006.01)
*A01J 11/00* (2006.01)

(52) U.S. Cl. .............................. 99/475; 99/468; 99/482

(58) Field of Classification Search .................... 99/475, 99/474, 468, 443 C, 481, 482, 484; 426/233, 426/315, 506, 523
See application file for complete search history.

(56) References Cited

U.S. PATENT DOCUMENTS

| 2,352,590 | A | * | 6/1944 | Trinkle | 426/233 |
|---|---|---|---|---|---|
| 2,533,926 | A | * | 12/1950 | Gershel | 96/360 |
| 3,903,788 | A | * | 9/1975 | Freeland et al. | 99/475 |
| 4,309,938 | A | * | 1/1982 | Harmon | 99/477 |
| 4,717,572 | A | * | 1/1988 | Buller-Colthurst | 426/233 |
| 4,976,009 | A | * | 12/1990 | Gladd | 452/198 |
| 5,195,423 | A | | 3/1993 | Beller | |
| 5,339,727 | A | * | 8/1994 | Fessmann | 99/482 |
| 5,913,967 | A | * | 6/1999 | Eisele | 99/468 |
| 5,967,027 | A | * | 10/1999 | Higashimoto | 99/472 |
| 6,203,834 | B1 | * | 3/2001 | Anders et al. | 426/314 |
| 2007/0131234 | A1 | * | 6/2007 | Moore | 131/296 |

* cited by examiner

*Primary Examiner* — Reginald L. Alexander
*Assistant Examiner* — Hemant Mathew

(57) ABSTRACT

A smoking system for cooking food products includes a controller, a smoke generator electrically coupled to the controller, a smoke chamber including first and second trolleys juxtaposed side-by-side, and a first duct with opposed ends directly coupled to the smoke generator and the smoke chamber. The system further includes a plurality of circulation motors, second and third ducts directly coupled to the motors and the trolleys respectively, and a cleaning section in fluid communication with the first and second trolleys. A ventilation motor is directly connected to the cleaning section, and a fifth duct is provided with an associated damper.

6 Claims, 3 Drawing Sheets

AUTOMATIC SMOKING SYSTEM FOR FOOD PRODUCTS AND ASSOCIATED METHOD

CROSS REFERENCE TO RELATED APPLICATIONS

This application claims the benefit of U.S. Provisional Application No. 60/835,578, filed Aug. 7, 2006, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to food processing systems and, more particularly, to an automatic food processing system for processing, cooking, and packaging various types of meats.

2. Prior Art

Chickens are one of the most important food sources in the world and the number of chickens raised for this purpose, internationally, averages more than 10 billion at any given time. The U.S., birthplace of Colonel Sanders Kentucky fried chicken is, not surprisingly, one of the largest consumer nations of chickens in the world. Americans consume more chickens than anyone else in the world except for the residents of Hong Kong.

In 1940, the average American consumed about only two pounds of broiler meat a year and 14 pounds of chicken altogether. "Broiler" refers to weight range of the birds as designated by the U.S. Department of Agriculture. Broilers are immature chickens. In 1950, broilers were chickens 15-16 weeks old. Now, 6-week-old chickens fall into the broiler weight specification. In 2004, the average American ate 79.7 pounds of broiler meat, 40 times more than in 1940, (and 81.2 pounds of total chicken), according to the USDA.

During the same time period, consumption of red meat increased but not by nearly as great a percentage. Annual consumption of all red meats went from 142 pounds per person in 1940 to 169 pounds per person in 2004. The rise of chickens to such a prominent position in the American diet can be attributed to important changes in the way chicken was marketed to the public and Colonel Harlan Sanders, the founder of Kentucky Fried Chicken. In the early 1960s, Sanders' restaurants offered housewives the option of picking up tasty fried chicken meals without the mess and fuss of preparing them at home. Americans like chicken prepared in other ways such as roasted, broiled, or barbecued. For some reason, however, no one has ever introduced smoked chickens in the U.S., a tasty and healthy way of cooking chickens that is enjoyed in other parts of the world.

U.S. Pat. No. 4,976,009 to Gladd discloses a multi-product meat processing assembly for smoking meat. The assembly includes a plurality of sequentially adjacent chambers and trolley assemblies for carrying meats hung from racks through the chambers. An indexing mechanism positions the racks at predetermined positions within each of the chambers. The assembly also includes telescoping doorways separating the chambers. The assembly further includes a reversible fan for moving air in two directions through each of the chambers. Unfortunately, this prior art example does not automatically smoke a meat product.

U.S. Pat. No. 5,195,423 to Belier discloses a two-part smoker assembly having a slide-detachable fire chamber engageable to a separable smoking chamber. The chamber is capable of being mountably rested atop the firebox walls of a grill. The slide-detachable smoking chamber has front and rear access doors, a side opening for side-attaching the fire chamber thereto, a top-opening for mounting a cover lid thereon, and food racks for supporting food materials within the smoking chamber. Within the smoking chamber, rack supports for the food racks are provided for adjusting the food racks to various levels. The cover is hinged and consists of a central piano hinge, which divides the cover lid into two openable halves and allows access to the food racks from the top front or top rear of the assembly. The slide-detachable fire chamber includes a stoking door to facilitate loading a fuel source, such as wood, a gas assist apparatus, a bottom ash pit, an ash door for holding and emptying ashes, draft dampers, and a smoke outlet for communication to the side opening of the smoking chamber. Unfortunately, this prior art example does not automatically smoke a meat product.

U.S. Pat. No. 6,203,834 to Anders discloses an apparatus and method for cooking and smoking food items and a smoked product produced by the inventive method. The inventive apparatus preferably comprises an oven including a belt-type conveyor, for continuously conveying food items through the oven, and a circulation system for circulating a cooking medium in the oven such that the cooking medium contacts and cooks the food items. The apparatus further includes a smoke generation and delivery system for delivering smoke to the circulating system such that the smoke contacts the food items along with the cooking medium. The inventive method preferably comprises the steps of continuously conveying food items through an oven and delivering smoke into the oven such that the smoke contacts the food items. The oven used in the inventive apparatus and inventive method is preferably an indirect-fired oven. The smoke most preferably contacts the food items in an impinging manner. Unfortunately, this prior art example does not automatically smoke a meat product.

Accordingly, a need remains for an automatic smoking system in order to overcome the above noted shortcomings. The present invention satisfies such a need by providing a system that is convenient and easy to use, durable in design, and designed for processing, cooking, and packaging various types of meats. The automatic smoking system provides an efficient method for processing and packaging poultry and meat products to thereby produce healthy and tasty food items to users, for a reasonable price. The present invention is simple to use, inexpensive, and designed for many years of repeated use.

BRIEF SUMMARY OF THE INVENTION

In view of the foregoing background, it is therefore an object of the present invention to provide an apparatus for processing, cooking, and packaging various types of meats. These and other objects, features, and advantages of the invention are provided by an automatic smoking system.

A smoking system for cooking food products includes a controller. The system further includes a smoke generator electrically coupled to the controller. Such a smoke generator is seated exterior of the smoke chamber. The system further includes a smoke chamber including first and second trolleys juxtaposed side-by-side. Such first and second trolleys are effectively in fluid communication with each other.

The system further includes a first duct with opposed ends directly coupled to the smoke generator and the smoke chamber. Such a first duct is conveniently provided with an associated damper situated along a travel path thereof for regulating a volume of smoke entering the smoke chamber. The system further includes a plurality of circulation motors seated on respective top surfaces of the first and second trolleys respectively. Each of such circulation motors are independently operable from the one-way valves of the cleaning section so that air flow is restricted from exiting the first and second trolleys as desired by the user.

The system further includes second and third ducts directly coupled to the motors and the trolleys respectively such that air flow is advantageously directed into the smoke chamber from the respective top surfaces. The system further includes a cleaning section in fluid communication with the first and second trolleys in such a manner that an external water source directs water into the smoke chamber from the respective top surfaces of the first and second trolleys and downwardly towards a bottom of the smoke chamber. Such a cleaning section includes a plurality of ducts and a plurality of one-way valves directly coupled thereto. Each of such cleaning section ducts is directly matted to the top surfaces of the first and second trolleys and the external water supply source respectively, and the controller is electrically coupled to the external water supply source and the valves such that each of the one-way valves are independently actuated between open and closed positions as desired by a user.

The system further includes a ventilation motor directly connected to the cleaning section and located upstream thereof such that water does not enter the ventilation motor and a fourth duct effectively extending outwardly from the ventilation motor and including an associated damper coupled thereto for regulating air flow outwardly from the smoke chamber. Each of such dampers are electrically coupled to the controller.

The smoking system further includes a fifth duct provided with an associated damper. Such a fifth duct is directly coupled to the second trolley and conveniently spaced from the first trolley for directly exhausting smoke outwardly from the second trolley and is situated adjacent to the first duct so that excess smoke is quickly exhausted out from the second trolley prior to reaching the first trolley.

A method for cooking food products includes the steps of: providing a controller; providing a smoke generator electrically coupled to the controller; and providing a smoke chamber including first and second trolleys juxtaposed side-by-side. Such first and second trolleys are in fluid communication with each other.

The steps further include: directly coupling opposed ends of a first duct to the smoke generator and the smoke chamber; attaching a damper to the first duct by situating the damper along a travel path of the first duct for regulating a volume of smoke entering the smoke chamber; seating a plurality of circulation motors on respective top surfaces of the first and second trolleys respectively; directly coupling second and third ducts to the motors and the trolleys respectively such that air flow is directed into the smoke chamber from the respective top surfaces; providing a cleaning section in fluid communication with the first and second trolleys in such a manner that an external water source directs water into the smoke chamber from the respective top surfaces of the first and second trolleys and downwardly towards a bottom of the smoke chamber; directly connecting a ventilation motor to the cleaning section by locating the ventilation motor upstream thereof such that water does not enter the ventilation motor; and outwardly connecting a fourth duct from the ventilation motor and coupling an associated damper thereto for regulating air flow outwardly from the smoke chamber. Each of the dampers is electrically coupled to the controller.

The method further including the step of: directly coupling a fifth duct provided with an associated damper to the second trolley and spaced from the first trolley for directly exhausting smoke outwardly from the second trolley. Such a fifth duct is situated adjacent to the first duct so that excess smoke is quickly exhausted out from the second trolley prior to reaching the first trolley.

The method further includes providing a plurality of ducts and a plurality of one-way valves directly coupled thereto. Each of such cleaning section ducts is directly matted to the top surfaces of the first and second trolleys and the external water supply source respectively, and the controller is electrically coupled to the external water supply source and the valves such that each of the one-way valves are independently actuated between open and closed positions as desired by a user.

The method further includes the step of independently toggling each of the circulation motors and the one-way valves of the cleaning section in such a manner so that air flow is restricted from exiting the first and second trolleys as desired by the user.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
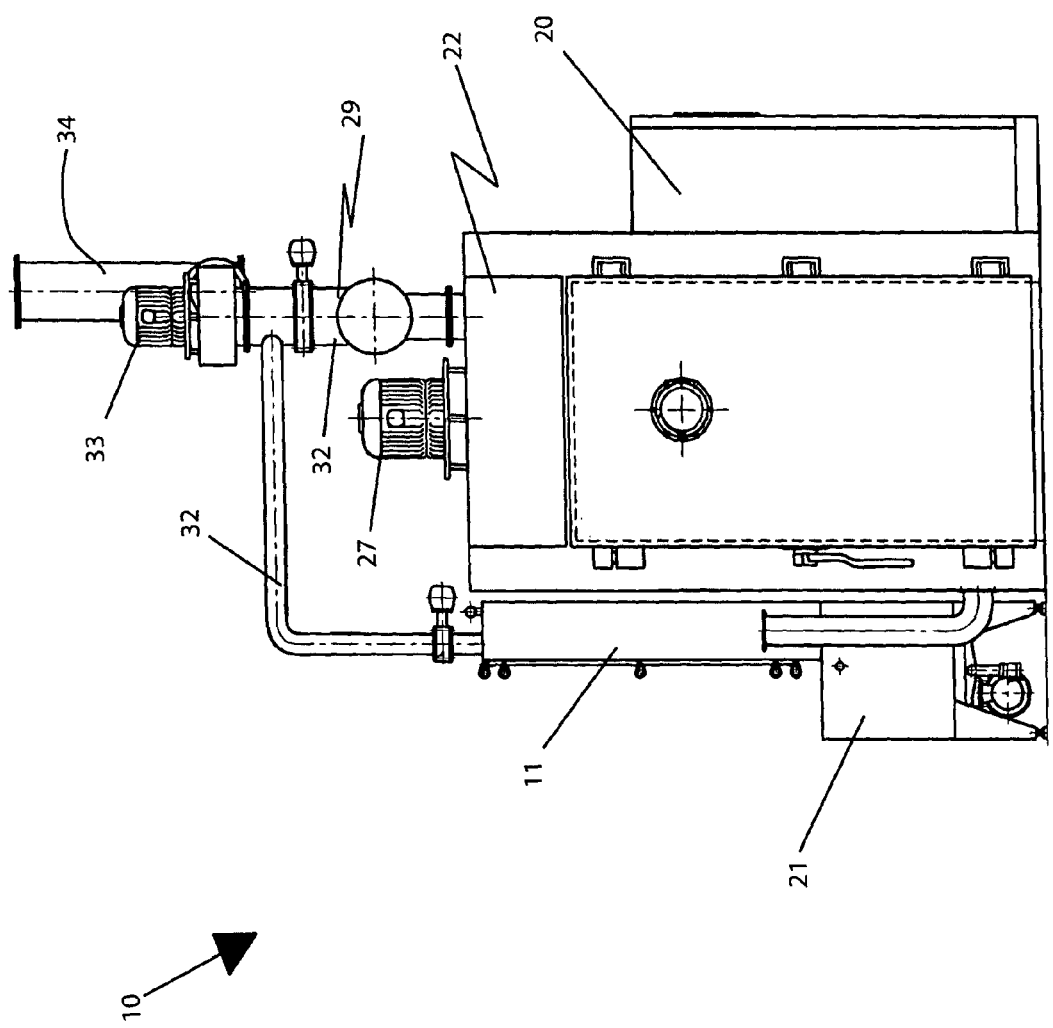
FIG. 1 is a side elevational view of the present invention.
Figure 2:
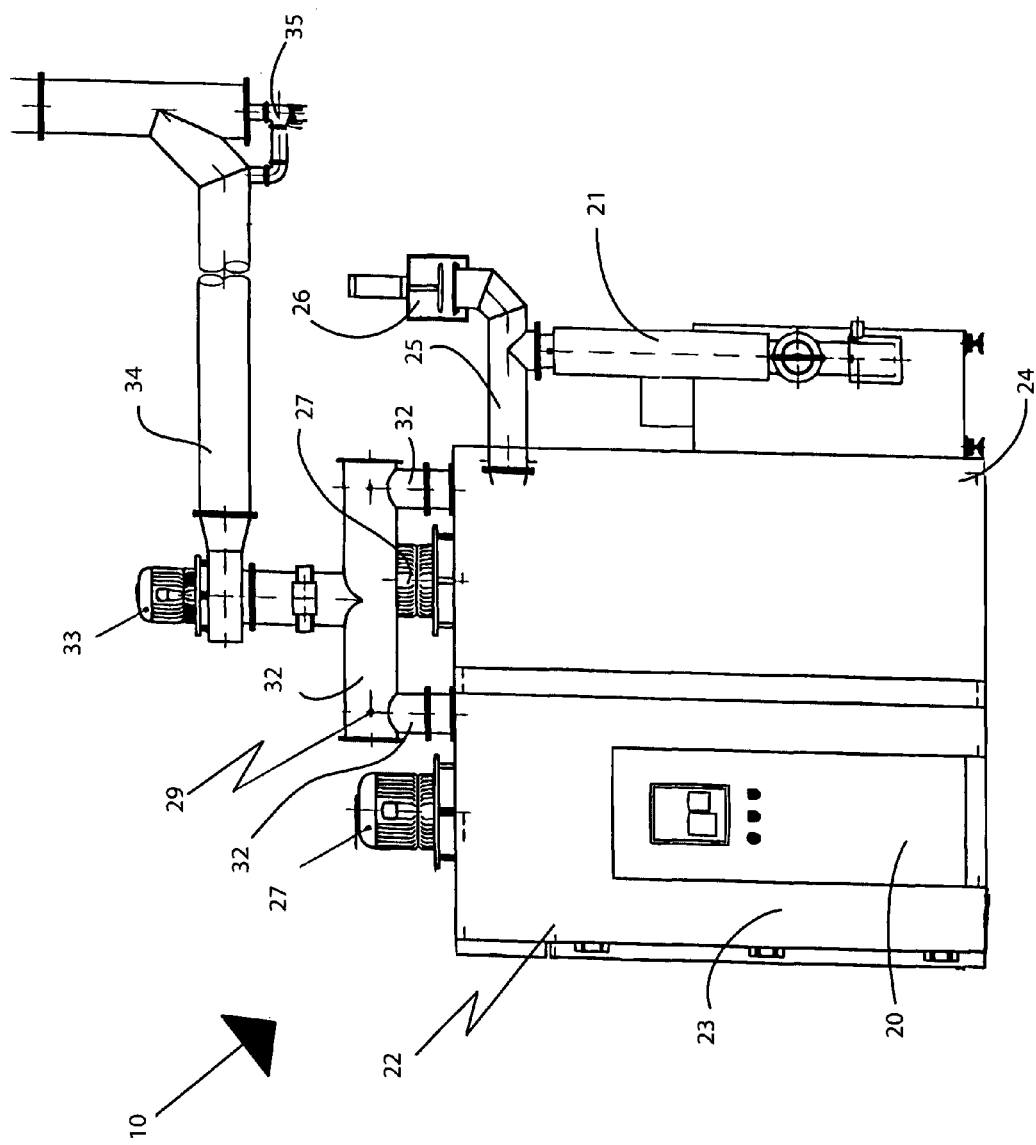
FIG. 2 is a front elevational view of the present invention.
Figure 3:
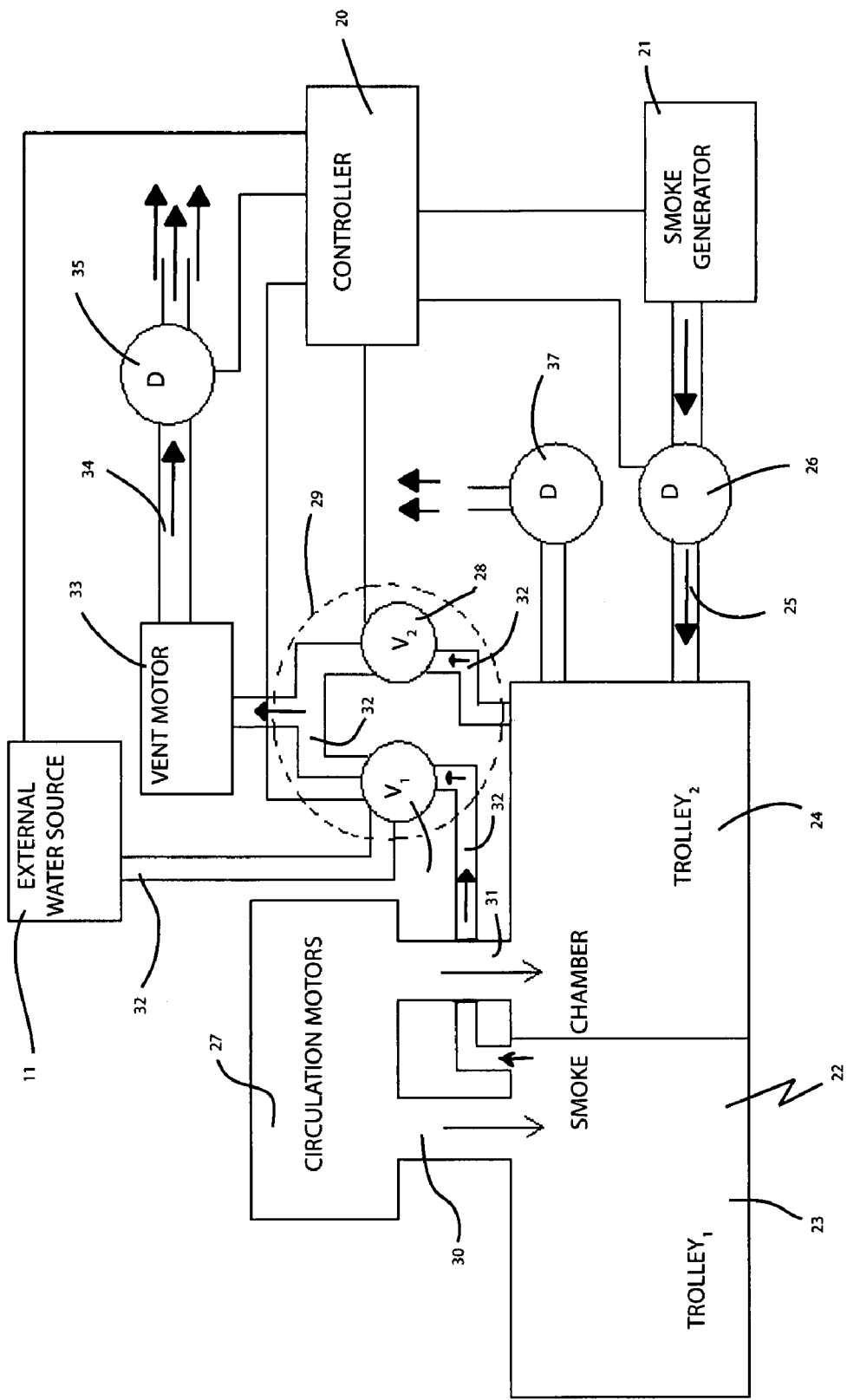
FIG. 3 is a schematic block diagram of the present invention.

The apparatus of this invention is referred to generally in FIGS. 1-3 by the reference numeral 10 and is intended to protect an automatic smoking system. It should be understood that the apparatus 10 may be used to smoke and process many different types of meats and should not be limited to smoking and processing only those types of meats mentioned herein.

Referring to FIGS. 1, 2 and 3, a smoking system for cooking food products includes a controller 20. The system further includes a smoke generator 21 electrically coupled to the controller 20. Such a smoke generator 21 is seated exterior of the smoke chamber 22. The system further includes a smoke chamber 22 including first and second trolleys 23, 24 juxtaposed side-by-side. Such first and second trolleys 23, 24 are in fluid communication with each other. The controller 20 allows a user to control the operations of the system.

Referring again to FIGS. 1, 2 and 3, the system further includes a first duct 25 with opposed ends directly coupled, without the use of intervening elements, to the smoke generator 21 and the smoke chamber 22. Such a first duct 25 is provided with an associated damper 26 situated along a travel path thereof for regulating a volume of smoke entering the smoke chamber 22. The system further includes a plurality of circulation motors 27 seated on respective top surfaces of the first and second trolleys 23, 24 respectively. Each of such circulation motors 27 are independently operable from the one-way valves 28 of the cleaning section 29 which is essential so that air flow is restricted from exiting the first and second trolleys 23, 24 as desired by the user. The circulation motors 27 ensure that the air within the trolleys 23, 24 is moved around the meat.

Referring again to FIGS. 1, 2 and 3, the system further includes second and third ducts 30, 31 directly coupled, without the use of intervening elements, to the motors 27 and the trolleys 23, 24 respectively which is critical such that air flow is directed into the smoke chamber 22 from the respective top surfaces. The ducts 30, 31 direct the smoke into the trolleys 23, 24. The system further includes a cleaning section 29 in fluid communication with the first and second trolleys 23, 24 in such a manner that an external water source 11 directs water into the smoke chamber 22 from the respective top surfaces of the first and second trolleys 23, 24 and downwardly towards a bottom of the smoke chamber 22. Such a cleaning section 29 includes a plurality of ducts 32 and a plurality of one-way valves 28 directly coupled thereto, without the use of intervening elements. Each of such cleaning section ducts 32 is directly matted, without the use of intervening elements, to the top surfaces of the first and second trolleys 23, 24 and the external water supply source 11 respectively, and the controller 20 is electrically coupled to the external water supply source 11 and the valves 28 which is crucial such that each of the one-way valves 28 are independently actuated between open and closed positions as desired by a user. The cleaning section provides for automatic cleaning of the system, as needed, by opening the one way valves in order to allow the water to enter the system.

Referring again to FIGS. 1, 2 and 3, the system further includes a ventilation motor 33 directly connected, without the use of intervening elements, to the cleaning section 29 and located upstream thereof which is vital such that water does not enter the ventilation motor 33 and a fourth duct 34 extending outwardly from the ventilation motor 33 and including an associated damper 35 coupled thereto for regulating air flow outwardly from the smoke chamber 22. Each of such dampers 35 is electrically coupled to the controller 20. The dampers 35 ensure that a proper amount of smoke remains in the trolleys 23, 24 during operation of the system.

Referring again to FIGS. 1, 2 and 3, the smoking system 10 further includes a fifth duct 36 provided with an associated damper 37. Such a fifth duct 36 is directly coupled, without the use of intervening elements, to the second trolley 24 and spaced from the first trolley 23 for directly exhausting smoke outwardly from the second trolley 24 and is situated adjacent to the first duct 25 which is necessary so that excess smoke is quickly exhausted out from the second trolley 24 prior to reaching the first trolley 23. The fifth duct 36 allows exhausted smoke to be removed from the system 10.

In use, the present invention provides a simple and straightforward method for preparing delicious and healthy chicken products. First, the chickens or other meats should be prepared and seasoned as desired by a user. The chickens are then smoked in the system for approximately one and a half hours. The chickens are then removed from the system, cut into appropriately sized pieces, and packed in vacuum sealed packages. A similar process may be used with other meat products as well.

The present invention, as claimed, provides the unexpected and unpredictable benefit of automatically regulating the amount of smoke that is used during processing by providing ducts and dampers that work cooperatively. In addition, the cleaning section uses an external water source to clean the system as needed. Such benefits overcome the prior art shortcomings.

In use, a method for cooking food products includes the steps of: providing a controller 20; providing a smoke generator 21 electrically coupled to the controller 20; and providing a smoke chamber 22 including first and second trolleys 23, 24 juxtaposed side-by-side. Such first and second trolleys 23, 24 are in fluid communication with each other.

In use, the steps further include: directly coupling, without the use of intervening elements, opposed ends of a first duct 25 to the smoke generator 21 and the smoke chamber 22; attaching a damper 26 to the first duct 25 by situating the damper 26 along a travel path of the first duct 25 for regulating a volume of smoke entering the smoke chamber 22; seating a plurality of circulation motors 27 on respective top surfaces of the first and second trolleys 23, 24 respectively; directly coupling, without the use of intervening elements, second and third ducts 30, 31 to the motors 27 and the trolleys 23, 24 respectively such that air flow is directed into the smoke chamber 22 from the respective top surfaces; providing a cleaning section 29 in fluid communication with the first and second trolleys 23, 24 in such a manner that an external water source 11 directs water into the smoke chamber 22 from the respective top surfaces of the first and second trolleys 23, 24 and downwardly towards a bottom of the smoke chamber 22; directly connecting, without the use of intervening elements, a ventilation motor 33 to the cleaning section 29 by locating the ventilation motor 33 upstream thereof such that water does not enter the ventilation motor 33; and outwardly connecting a fourth duct 34 from the ventilation motor 33 and coupling an associated damper 35 thereto for regulating air flow outwardly from the smoke chamber 22. Each of the dampers 35 is electrically coupled to the controller 20.

In use, the method further includes the step of: directly coupling, without the use of intervening elements, a fifth duct 36 provided with an associated damper 37 to the second trolley 24 and spaced from the first trolley 23 for directly exhausting smoke outwardly from the second trolley 24. Such a fifth duct 36 is situated adjacent to the first duct 25 so that excess smoke is quickly exhausted out from the second trolley 24 prior to reaching the first trolley 23.

In use, the method further includes providing a plurality of ducts 32 and a plurality of one-way valves 28 directly coupled thereto. Each of such cleaning section ducts 32 is directly matted, without the use of intervening elements, to the top surfaces of the first and second trolleys 23, 24 and the external water supply source 11 respectively, and the controller 20 is electrically coupled to the external water supply source 11 and the valves 28 such that each of the one-way valves 28 are independently actuated between open and closed positions as desired by a user.

In use, the method further includes the step of independently toggling each of the circulation motors 27 and the one-way valves 28 of the cleaning section 29 in such a manner so that air flow is restricted from exiting the first and second trolleys 23, 24 as desired by the user.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A smoking system for cooking food products, said smoking system comprising:
    a controller;
    a smoke generator electrically coupled to said controller;
    a smoke chamber including first and second trolleys juxtaposed side-by-side, said first and second trolleys being in fluid communication with each other;
    a first duct having opposed ends directly coupled to said smoke generator and said smoke chamber, said first duct being provided with an first damper situated along a travel path thereof for regulating a volume of smoke entering said smoke chamber;
    a plurality of circulation motors seated on respective top surfaces of said first and second trolleys respectively;
    second and third ducts directly coupled to said circulation motors and said trolleys respectively such that air flow is directed into said smoke chamber from said respective top surfaces;
    a cleaning section in fluid communication with said first and second trolleys in such a manner that an external water source directs water into said smoke chamber from said respective top surfaces of said first and second trolleys and downwardly towards a bottom of said smoke chamber;
    a ventilation motor directly connected to said cleaning section and located upstream thereof such that said water does not enter said ventilation motor; and
    a fourth duct extending outwardly from said ventilation motor and including a second damper coupled thereto for regulating said air flow outwardly from said smoke chamber; a fifth duct provided with a third damper, said fifth duct being directly coupled to said second trolley and spaced from said first trolley for directly exhausting smoke outwardly from said second trolley, wherein said fifth duct is situated adjacent to said first duct so that excess smoke is quickly exhausted out from said second trolley prior to reaching said first trolley;

wherein said smoke generator is seated exterior of said smoke chamber.

2. The smoking system of claim 1, wherein said cleaning section comprises:
    a plurality of cleaning section ducts and a plurality of one-way valves directly coupled thereto, each of said cleaning section ducts being directly matted to said top surfaces of said first and second trolleys and the external water supply source respectively, said controller being electrically coupled to the external water supply source and said valves such that each of said one-way valves are independently actuated between open and closed positions as desired by a user.

3. The smoking system of claim 2, wherein each of said circulation motors are independently operable from said one-way valves of said cleaning section so that said air flow is restricted from exiting said first and second trolleys as desired by the user.

4. A smoking system for cooking food products, said smoking system comprising:
    a controller;
    a smoke generator electrically coupled to said controller;
    a smoke chamber including first and second trolleys juxtaposed side-by-side, said first and second trolleys being in fluid communication with each other;
    a first duct having opposed ends directly coupled to said smoke generator and said smoke chamber, said first duct being provided with a first damper situated along a travel path thereof for regulating a volume of smoke entering said smoke chamber;
    a plurality of circulation motors seated on respective top surfaces of said first and second trolleys respectively;
    second and third ducts directly coupled to said circulation motors and said trolleys respectively such that air flow is directed into said smoke chamber from said respective top surfaces;
    a cleaning section in fluid communication with said first and second trolleys in such a manner that an external water source directs water into said smoke chamber from said respective top surfaces of said first and second trolleys and downwardly towards a bottom of said smoke chamber;
    a ventilation motor directly connected to said cleaning section and located upstream thereof such that said water does not enter said ventilation motor; and
    a fourth duct extending outwardly from said ventilation motor and including a second damper coupled thereto for regulating said air flow outwardly from said smoke chamber; a fifth duct provided with a third damper, said fifth duct being directly coupled to said second trolley and spaced from said first trolley for directly exhausting smoke outwardly from said second trolley, wherein said fifth duct is situated adjacent to said first duct so that excess smoke is quickly exhausted out from said second trolley prior to reaching said first trolley;

wherein each of said dampers are electrically coupled to said controller;

wherein said smoke generator is seated exterior of said smoke chamber.

5. The smoking system of claim 4, wherein said cleaning section comprises:
   a plurality of cleaning section ducts and a plurality of one-way valves directly coupled thereto, each of said cleaning section ducts being directly matted to said top surfaces of said first and second trolleys and the external water supply source respectively, said controller being electrically coupled to the external water supply source and said valves such that each of said one-way valves are independently actuated between open and closed positions as desired by a user.

6. The smoking system of claim 5, wherein each of said circulation motors are independently operable from said one-way valves of said cleaning section so that said air flow is restricted from exiting said first and second trolleys as desired by the user.

* * * * *